United States Patent
Kondo et al.

(10) Patent No.: US 6,229,579 B1
(45) Date of Patent: *May 8, 2001

(54) COLOR ENCODER WITH CHROMINANCE SUBCARRIER GENERATOR RESPONSIVE TO A PLURALITY OF CLOCK RATES OR FREQUENCIES

(75) Inventors: Masahito Kondo; Kyoji Marumoto, both of Kyoto (JP)

(73) Assignee: Rohm Co., Ltd., Kyoto (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/854,756

(22) Filed: May 12, 1997

(30) Foreign Application Priority Data

May 13, 1996 (JP) .................................................. 8-117842

(51) Int. Cl.[7] .............................. H04N 9/65; H04N 5/04
(52) U.S. Cl. ......................... 348/642; 348/501; 348/708
(58) Field of Search ........................... 348/642, 554–556, 348/558, 723, 724, 705, 706, 502, 708, 711, 713, 501

(56) References Cited

U.S. PATENT DOCUMENTS

| | | | | |
|---|---|---|---|---|
| 3,564,141 | * | 2/1971 | Hurst ..................................... | 348/501 |
| 5,057,911 | * | 10/1991 | Stec et al. .............................. | 348/642 |
| 5,301,015 | * | 4/1994 | Kim ................... | 348/642 X |
| 5,311,296 | * | 5/1994 | Ikefuji et al. ......................... | 348/708 |
| 5,394,197 | * | 2/1995 | Kim ...................................... | 348/708 |
| 5,406,335 | * | 4/1995 | Nikoh ................................... | 348/642 |
| 5,488,481 | * | 1/1996 | Okada et al. ......................... | 348/501 |

* cited by examiner

*Primary Examiner*—John W. Miller
(74) *Attorney, Agent, or Firm*—Arent Fox Kintner Plotkin & Kahn, PLLC

(57) ABSTRACT

A color encoder is incorporated in an apparatus for reproducing a signal recorded on a disk for a video-CD, CD-G, or similar system. The color encoder serves as an interface between such an apparatus and a television receiver. The color encoder has a color-difference signal forming circuit for forming a color-difference signal from R, G, and B signals reproduced from a disk, a modulation circuit for modulating a chrominance subcarrier with the color-difference signal, and chrominance subcarrier generating device for generating the chrominance subcarrier. Moreover, to generate a chrominance signal having the same frequency for any of a plurality of clocks having different predetermined frequencies, the chrominance subcarrier generating device has a plurality of ROMs, each containing in its data area a data table corresponding to a different frequency, and a ROM switching circuit for selecting a ROM to be accessed from among the plurality of ROMs in accordance with a switching signal.

15 Claims, 9 Drawing Sheets

• : CONVERSION DATA VALUES

• : CONVERSION DATA VALUES

COLOR ENCODER WITH CHROMINANCE SUBCARRIER GENERATOR RESPONSIVE TO A PLURALITY OF CLOCK RATES OR FREQUENCIES

BACKGROUND OF THE INVENTION

1. Field of the Invention

The present invention relates to a color encoder that is used in a digital image reproduction apparatus such as a video-CD or CD-G player so as to serve as an interface between such an apparatus and a television receiver.

2. Description of the Prior Art

A color encoder is used to obtain a color television signal from digital RGB signals reproduced from a disk. To achieve this, the color encoder converts the RGB signals into R-Y and B-Y color-difference signals, modulates a chrominance subcarrier with these color-difference signals to produce a modulated signal, and then inserts the chrominance subcarrier into the modulated signal at its color burst positions. The chrominance subcarrier is generated within the color encoder.

In a conventional color encoder, the chrominance subcarrier generator is provided with an address decoder and a data table. At every leading edge of the clock supplied from the outside, the chrominance subcarrier generator outputs, from the data table, the data stored at the address specified by the address decoder at that moment. The data outputted at predetermined time intervals in this way is then formed into a signal having a continuous waveform, and thus the chrominance subcarrier is produced. To achieve this, the data table is arranged in consideration of the frequency (hereinafter referred to as the clock rate) of the clock supplied from the outside and the desired frequency (hereinafter represented as $f_{sc}$) of the chrominance subcarrier. In other words, the data table is so arranged that a chrominance subcarrier having a desired frequency $f_{sc}$ can be obtained by supplying from the outside a clock having a predetermined clock rate.

In recent years, various digital image reproduction apparatus such as video-CD and CD-G players have emerged, and apparatus of different reproduction systems use different clock rates. For example, video-CD players use a clock rate of 13.3 MHz, and CD-G players use a clock rate of 14.318 MHz. As for video-CD players, models using a clock rate of 27.0 MHz are now on their way to superseding models using the 13.5 MHz clock rate. In this way, even digital image reproduction apparatus of the same reproduction system have come to use more than one clock rate.

On the other hand, different television systems are used in different areas of the world, and each television system requires a different $f_{sc}$ frequency. For example, the NTSC system adopted in countries like the United States and Japan uses an $f_{sc}$ frequency of 3.58 MHz, whereas the PAL system adopted in many European and Southeast Asian countries uses an $f_{sc}$ frequency of 4.43 MHz.

However, since conventional color encoders are provided with only one data table, they can simply produce a chrominance subcarrier having one specific frequency from a clock having a specific frequency. That is, conventional color encoders can only cope with a combination of one specific clock rate and one specific $f_{sc}$ frequency. Accordingly, to use digital image reproduction apparatus of different reproduction systems in combination with television receivers of different television systems, it is necessary to use as many color encoders as the number of possible combinations of the reproduction systems and the television systems.

SUMMARY OF THE INVENTION

An object of the present invention is to provide a color encoder that operates with a digital image reproduction apparatus of any reproduction system in combination with a television receiver of any television system.

To achieve the above object, according to one aspect of the present invention, a color encoder produces a color video signal from a three-primary-color signal and a clock supplied from outside by first generating a chrominance subcarrier from the clock by use of chrominance subcarrier generating means and then combining the three-primary-color signal with the chrominance subcarrier to produce the color video signal. In this color encoder, the chrominance subcarrier generating means includes means that generates a chrominance subcarrier having a same frequency in response to any of a plurality of clocks having different predetermined frequencies.

According to another aspect of the present invention, a color encoder produces a color video signal from a three-primary-color signal and a clock supplied from outside by first generating a chrominance subcarrier from the clock by use of chrominance subcarrier generating means and then combining the three-primary-color signal with the chrominance subcarrier to produce the color video signal. In this color encoder, the chrominance subcarrier generating means includes means that generates one of a plurality of chrominance subcarriers having different predetermined frequencies from a clock having a same frequency.

According to still another aspect of the present invention, a color encoder comprises RGB input terminals for receiving R, G, and B signals reproduced from a recording medium; a latch circuit for latching the R, G, and B signals; a color-difference signal forming circuit for forming a color-difference signal from the R, G, and B signals latched by the latch circuit; a modulation circuit for modulating a chrominance subcarrier with the color-difference signal output from the color-difference signal forming circuit; and chrominance subcarrier generating means for generating the chrominance subcarrier from a clock signal supplied from outside. In this color encoder, the chrominance subcarrier generating means includes means for generating a chrominance subcarrier having a same frequency in response to any of a plurality of clocks having different predetermined frequencies.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
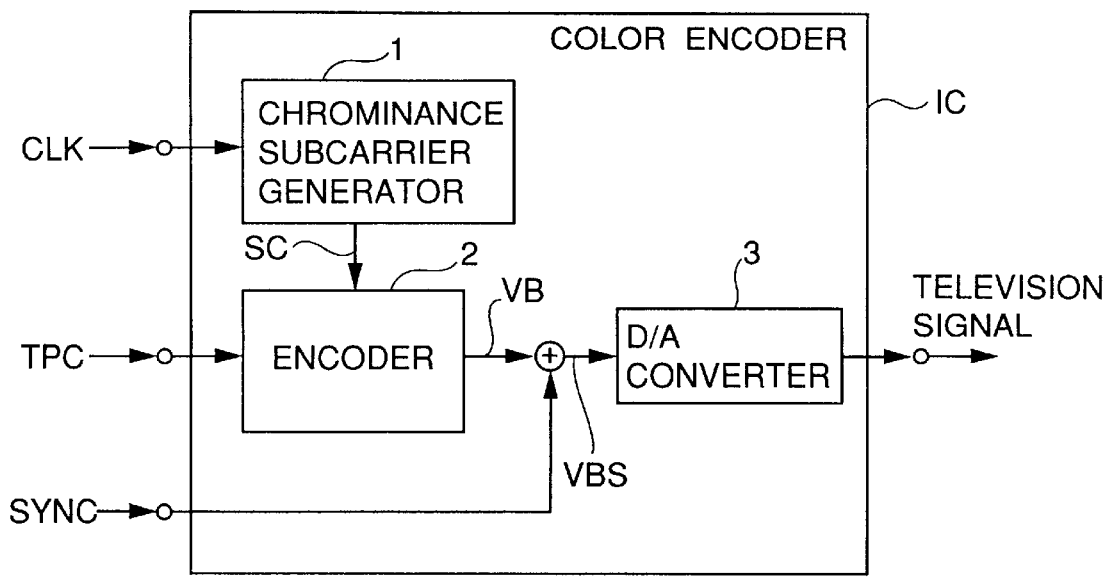
FIG. 1 is a block diagram of a typical color encoder.

FIG. 1 is a block diagram of a typical color encoder which is formed in a single integrated circuit chip IC. This color encoder is composed of a chrominance subcarrier generator 1, an encoder 2, and a digital-to-analog (hereinafter abbreviated to "D/A") converter 3. This color encoder operates as follows. First, the chrominance subcarrier generator 1, in accordance with a clock CLK supplied from outside the color encoder, generates a chrominance subcarrier SC, and supplies it to the encoder 2. The encoder 2, in accordance with a three-primary-color signal TPC supplied from the outside and the chrominance subcarrier SC supplied from the chrominance subcarrier generator 1, generates a color video signal VB. The color video signal VB is then multiplexed with various synchronizing signals SYNC to become a composite color video signal VBS. Subsequently, the composite color video signal VBS, which is a digital signal obtained from digital processing performed heretofore, is converted into an analog signal by the D/A converter 3 so as to be outputted as a television signal.

Figure 2:
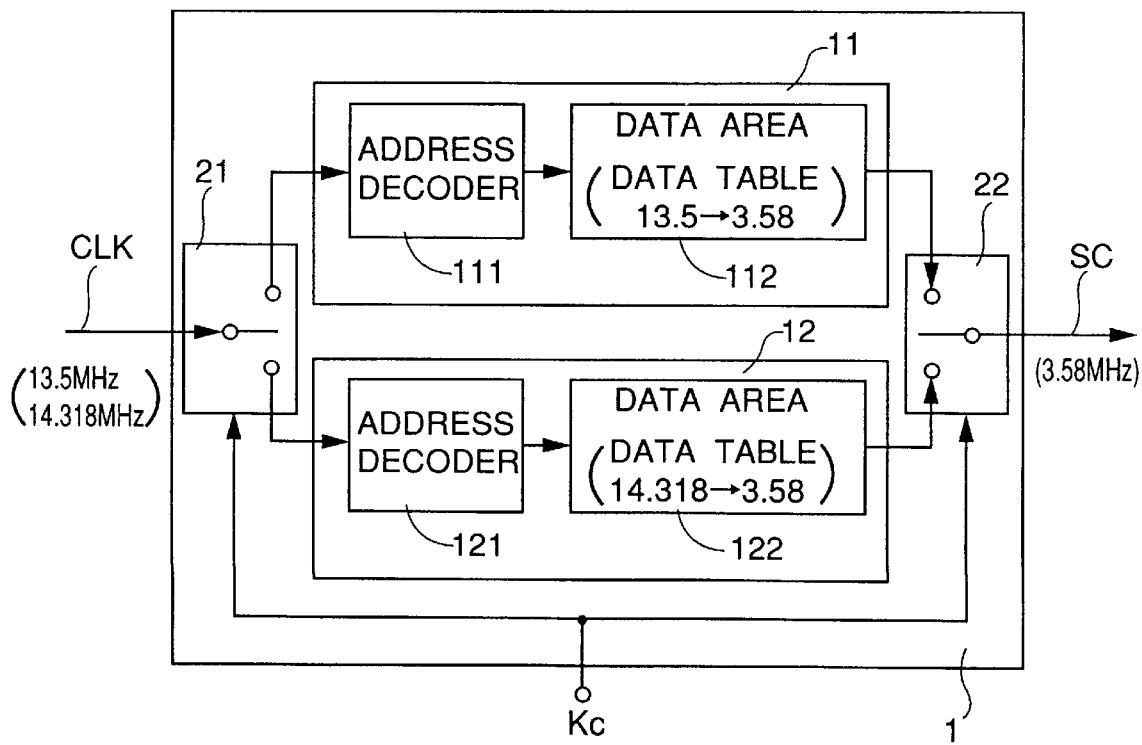
FIG. 2 is a diagram showing the construction of the chrominance subcarrier generator in the color encoder of a first embodiment of the present invention.

Hereinafter, color encoders embodying the present invention will be described with reference to the drawings. Note that, the construction of the color encoder shown in FIG. 1 is common to all of the color encoders described hereinafter. In the color encoder of a first embodiment, the chrominance subcarrier generator 1 is, as shown in FIG. 2, provided with a first ROM 11, a second ROM 12, and switches 21 and 22. The first and second ROMs 11 and 12 respectively have address decoders 111 and 121, and data areas 112 and 122. Here, the chrominance subcarrier SC is generated from a clock CLK supplied from the outside, by the use of a data table selected by the switches 21 and 22 from the data tables stored in the data areas 112 and 122 of the first and second ROMs 11 and 12.

In the first embodiment, in the data area 112 of the first ROM 11 is stored a data table used, for example, to obtain a 3.58 MHz $f_{sc}$ frequency for the NTSC system from a clock having the video-CD clock rate of 13.5 MHz, and in the data area 122 of the second ROM 12 is stored a data table used to obtain the same $f_{sc}$ frequency from a clock having the CD-G clock rate of 14.318 MHz. As a result, by setting, in accordance with a clock-rate switching signal $K_c$, the switches 21 and 22 to the first ROM positions when the clock rate is 13.5 MHz and to the second ROM positions when the clock rate is 14.318 MHz, it is possible to cope with two clock rates, i.e. 13.5 MHz and 14.318 MHz, as long as a television receiver designed for the NTSC system (in which $f_{sc}$ is 3.58 MHz) is used. In this way, it is possible to cope with digital image reproduction apparatus of two different reproduction systems, i.e. the video-CD and CD-G systems.

Figure 9:
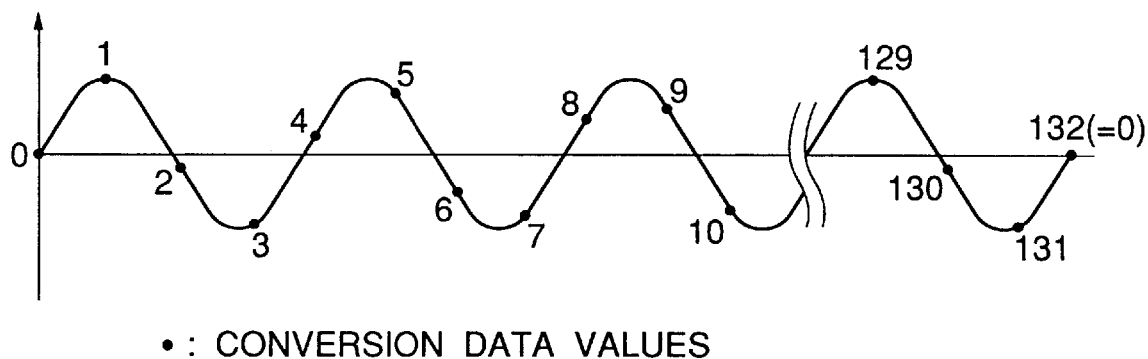
FIG. 9 is a diagram showing how a chrominance subcarrier having a frequency of 3.58 MHz is generated based on a clock having a frequency of 13.5 MHz in the present invention.
Figure 10:
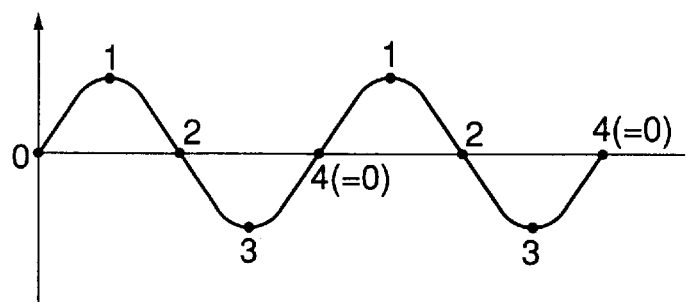
FIG. 10 is a diagram showing how a chrominance subcarrier having a frequency of 3.58 MHz is generated based on a clock having a frequency of 14.318 MHz in the present invention.

In this particular case, the data tables stored in the data areas 112 and 122 of the first and second ROMs 11 and 12 are configured as follows. In the data area 112 of the first ROM 11 is stored a data table used to achieve conversion from 13.5 MHz to 3.58 MHz. As shown in FIG. 9, this data table contains 132 pieces of conversion data used to produce 35 waves of the 3.58 MHz chrominance subcarrier from 132 waves of the 13.5 MHz clock. On the other hand, in the data area 122 of the second ROM 12 is stored a data table used to achieve conversion from 14.318 MHz to 3.58 MHz. As shown in FIG. 10, this data table contains 4 pieces of conversion data used to produce one wave of the 3.58 MHz chrominance subcarrier from four waves of the 14.318 MHz clock.

Figure 11:
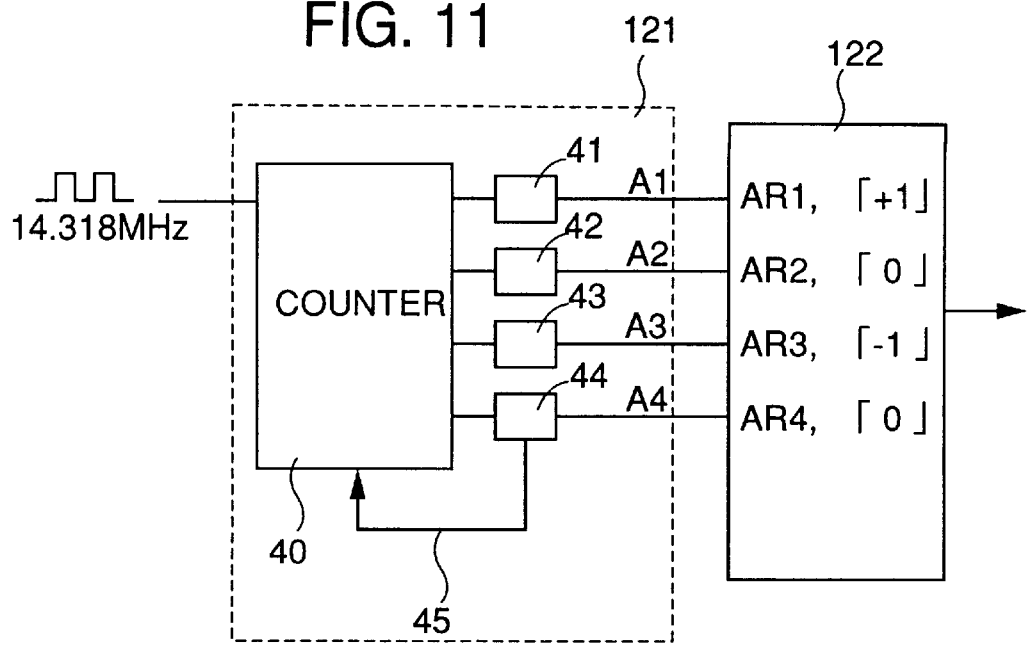
FIG. 11 is a block diagram showing the construction of part of the construction shown in FIG. 2.

More specifically, the address decoder and the data table are constructed as follows. Here, the address decoder 121 and the data table 122 in the second ROM 12 will be described as examples. As shown in FIG. 11, the address decoder 121 is provided with a counter 40 and four decoders 41 to 44. While the address decoder 121 is receiving the clock having a frequency of 14.318 MHz, the counter 40 counts pulses in the clock. When the count value equals one, the decoder 41 yields an output A1; when the count value equals two, the decoder 42 yields an output A2; when the count value equals three, the decoder 43 yields an output A3; when the count value equals 4, the decoder 44 yields an output A4. These A1 to A4 are address data for the data table 122. When the decoder 44 yields the output A4, it simultaneously provides a reset pulse to the counter 40 via a signal line 45. Thereafter, these operations are repeated as long as the address decoder 12 is receiving the clock. As a result, the output from the address decoder 121 as a whole, i.e. one of the outputs A1 to A4 from the decoders 41 to 44, points to one specific address within the data table 122 at a given time point. The data table 122 has a value "+1" stored at the address AR1, and outputs the value "+1" when the address AR1 is specified. Similarly, the data table 122 has values "0", "−1", and "0" stored at the addresses AR2, AR3, and AR4, respectively, and outputs the value stored at the specified address.

The first embodiment may be modified such that a data table used to obtain a 3.58 MHz $f_{sc}$ frequency for the NTSC system from a clock having the video-CD clock rate of 13.5 MHz is stored in the data area 112 of the first ROM 11 and a data table used to obtain a 4.43 MHz $f_{sc}$ frequency for the PAL system from the same clock is stored in the data area 122 of the second ROM 12. In this case, by setting, in accordance with an $f_{sc}$ switching signal $K_f$, the switches 21 and 22 to the first ROM positions when a 3.58 MHz $f_{sc}$ frequency is required and to the second ROM positions when a 4.43 MHz $f_{sc}$ frequency is required, it is possible to cope with two different $f_{sc}$ frequencies, i.e. 3.58 MHz and 4.43 MHz, as long as a video-CD player (which uses the clock rate of 13.5 MHz) is used. In this way, it is possible to cope with two different television systems, i.e. the NTSC and PAL systems.

As described above, when a color encoder is provided with a plurality of ROMs, each having a data table stored therein, so that a data table to be used for conversion is selected from among a plurality of data tables in accordance with a clock-rate switching signal $K_c$ or an $f_{sc}$ switching signal $K_f$, it is possible to cope with as many clock rates as the number of the provided data tables (ROMs) as long as one specific television system is used, or to cope with as many television systems as the number of the provided data tables (ROMs) as long as digital image reproduction apparatus of one specific reproduction system are used.

The clock-rate switching signal $K_c$ or the $f_{sc}$ switching signal $K_f$ is generated, for example, at the same time as the user selects a specific digital image reproduction apparatus or television system from available choices.

Figure 3:
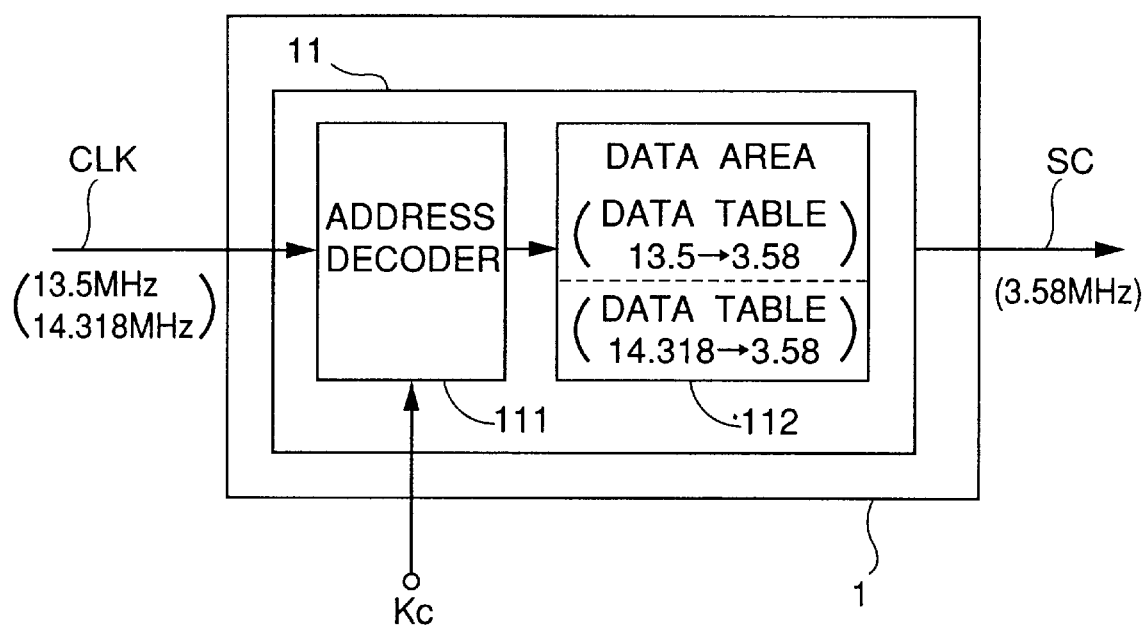
FIG. 3 is a diagram showing the detailed construction of part of the chrominance subcarrier generator in the first embodiment.

In cases where the ROM has a data area having an ample data storage capacity, it is also possible, instead of storing only one data table in each ROM as in the first embodiment described above, to divide the data area of a ROM into two or more subareas so that a data table is stored in each of those subareas, as shown in FIG. 3. In short, a ROM may contain more than one data table. This makes efficient use of the data area of a ROM possible, and thus helps reduce the number of ROMs required. In this case, the clock-rate switching signal $K_c$ needs to be so generated as to switch address groups properly so that the address decoder is provided with appropriate addresses.

Figure 4:
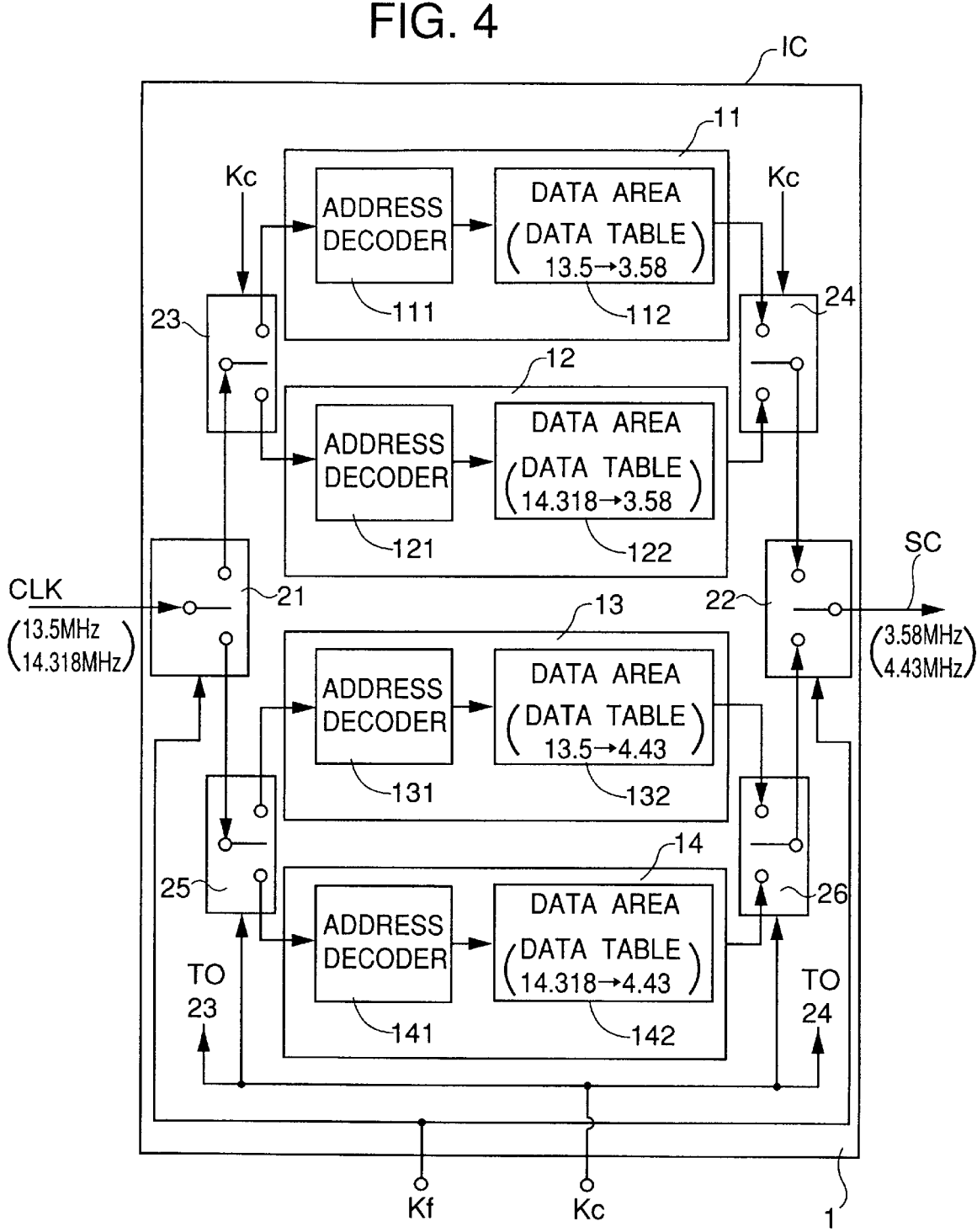
FIG. 4 is a diagram showing the construction of the chrominance subcarrier generator in the color encoder of a second embodiment of the present invention.

In the color encoder of a second embodiment, the chrominance subcarrier generator 1 is, as shown in FIG. 4, provided with a first ROM 11, a second ROM 12, a third ROM 13, a fourth ROM 14, and switches 21, 22, 23, 24, 25, and 26. The first to fourth ROMs 11 to 14 respectively have address decoders 111, 121, 131, and 141, and data areas 112, 122, 132, and 142. Here, the chrominance subcarrier SC is generated based on a clock CLK supplied from outside the integrated circuit chip IC, by the use of a data table selected by the switches 21 to 26 from the data tables stored in the data areas of the ROMs 11 to 14.

In the second embodiment, in the data area 112 of the first ROM 11 is stored a data table used, for example, to obtain a 3.58 MHz $f_{sc}$ frequency for the NTSC system from a clock having the video-CD clock rate of 13.5 MHz, and in the data area 122 of the second ROM 12 is stored a data table used to obtain the same $f_{sc}$ frequency from a clock having the CD-G clock rate of 14.318 MHz. Moreover, in the data area 132 of the third ROM 13 is stored a data table used to obtain a 4.43 MHz $f_{sc}$ frequency for the PAL system from a clock having the video-CD clock rate of 13.5 MHz, and in the data area 142 of the fourth ROM 14 is stored a data table used to obtain the same $f_{sc}$ frequency a clock having the CD-G clock rate of 14.318 MHz. As a result, by setting, in accordance with a clock-rate switching signal $K_c$ and an $f_{sc}$ switching signal, the switches 21 to 26 to the first ROM positions when the desired combination of the clock rate and the $f_{sc}$ frequency is 13.5 MHz and 3.58 MHz, to the second ROM positions when the desired combination is 14.318 MHz and 3.58 MHz, to the third ROM positions when the desired combination is 13.5 MHz and 4.43 MHz, and to the fourth ROM positions when the desired combination is 14.318 MHz and 4.43 MHz, it is possible to cope with two clock rates, i.e. 13.5 MHz and 14.318 MHz, as well as two $f_{sc}$ frequencies, i.e. 3.58 MHz and 4.43 MHz. In this way, it is possible to cope with digital image reproduction apparatus of two different reproduction systems, i.e. the video-CD and CD-G systems, as well as two different television systems, i.e. the NTSC and PAL systems.

As described above, when a color encoder is provided with a plurality of ROMs, each having a data table stored therein, so that a data table to be used for conversion is selected from among a plurality of data tables in accordance with a clock-rate switching signal $K_c$ and an $f_{sc}$ switching signal $K_f$, it is possible to cope with as many combinations of clock rates and $f_{sc}$ frequencies as the number of the provided data tables, and thus it is possible to cope with image reproduction apparatus of various reproduction systems as well as various television systems.

The clock-rate switching signal $K_c$ and the $f_{sc}$ switching signal $K_f$ are generated, for example, at the same time as the user selects a specific combination of a digital image reproduction apparatus and a television system from available choices.

Figure 5:
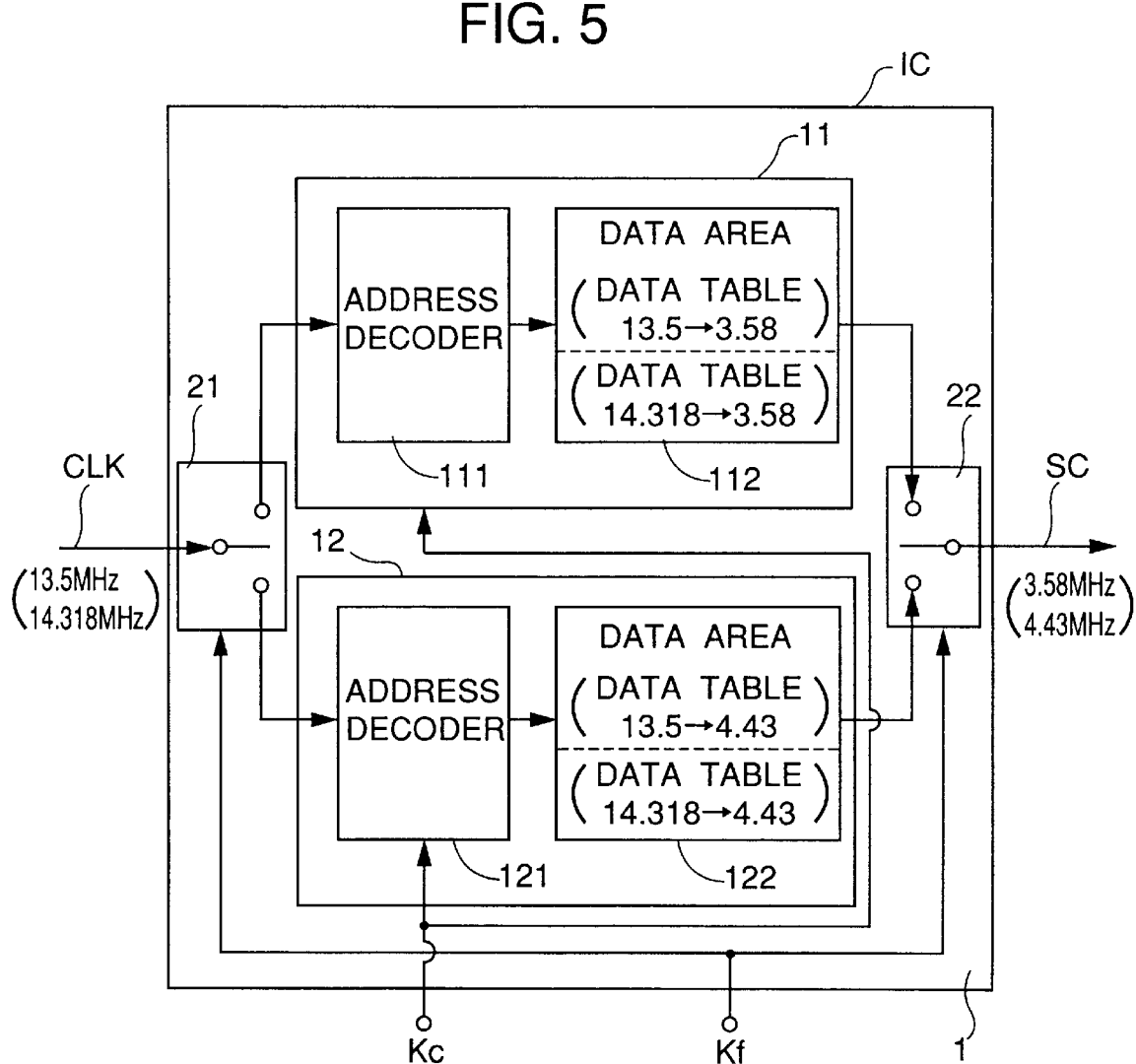
FIG. 5 is a diagram showing a modified construction of the chrominance subcarrier generator in the second embodiment.

In cases where the ROM has a data area having an ample data storage capacity, it is also possible, instead of storing only one data table in each ROM as in the second embodiment described above, to divide the data area of a ROM into two or more subareas so that a data table is stored in each of those subareas, as shown in FIG. 5. In short, a ROM may contain more than one data table. This makes efficient use of the data area of a ROM possible, and thus helps reduce the number of ROMs required. In this case, the clock-rate switching signal $K_c$ needs to be so generated as to switch address groups properly so that the address decoder is provided with appropriate addresses.

Figure 6:
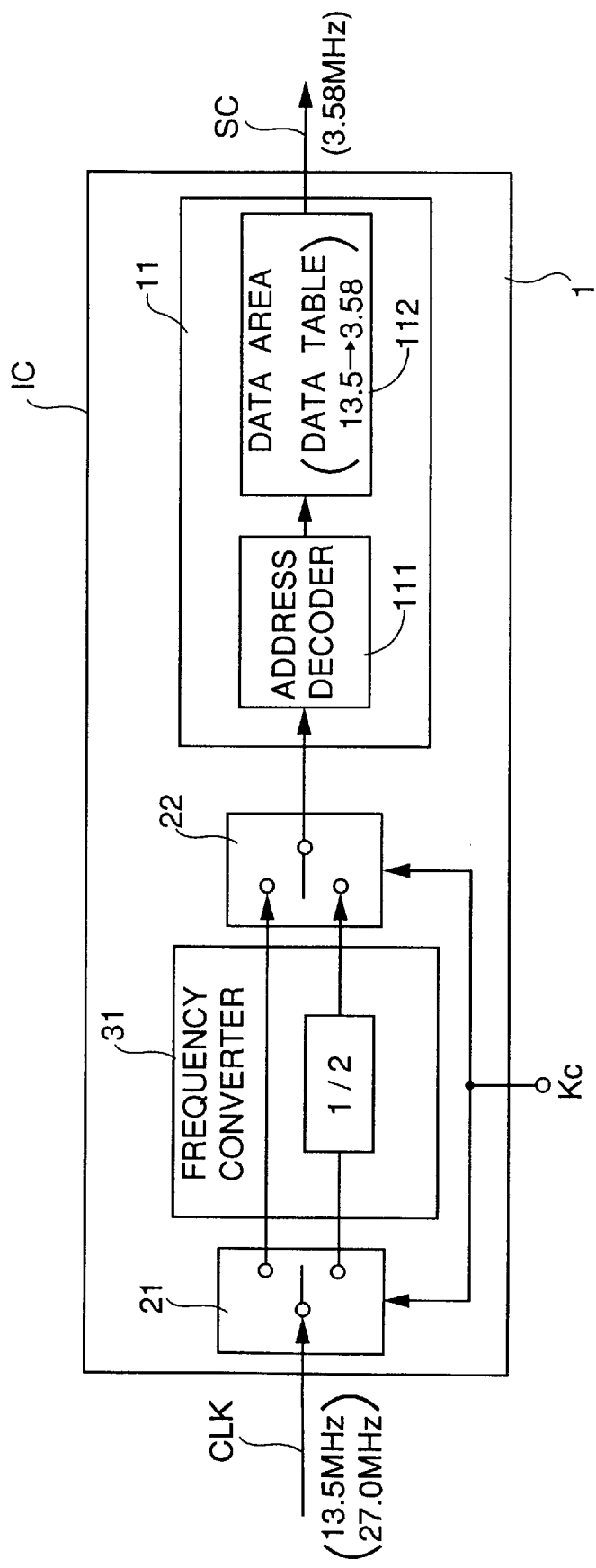
FIG. 6 is a diagram showing the construction of the chrominance subcarrier generator in the color encoder of a third embodiment of the present invention.

In the color encoder of a third embodiment, the chrominance subcarrier generator 1 is, as shown in FIG. 6, provided with a first ROM 11, switches 21 and 22, and a frequency converter 31. The first ROM 11 has an address decoder 111 and a data area 112. Here, the chrominance subcarrier SC is generated from a clock CLK supplied from the outside, by the use of the data table stored in the data area of the first ROM 11.

In the third embodiment, in the data area 112 of the first ROM 11 is stored a data table used to obtain a 3.58 MHz $f_{sc}$ frequency from a clock having a clock rate of 13.5 MHz. The frequency converter 31 has a frequency-dividing path through which a frequency is divided by two, and a through path through which a frequency is passed unprocessed.

The third embodiment is used, for example, to cope with the two clock rates, i.e. 13.5 MHz and 27.0 MHz, used in the video-CD system. In this case, by setting, in accordance with a clock-rate switching signal $K_c$, the switches 21 and 22 to the through-path positions when the clock rate is 13.5 MHz and to the frequency-dividing positions when the clock rate is 27.0 MHz, it is possible to cope with both clock rates. This is because, when the clock rate is 27.0 MHz, the clock is passed through the frequency-dividing path of the frequency converter 31 so that the clock rate is converted into 13.5 MHz before a 3.58 MHz $f_{sc}$ frequency is generated by the use of the data table stored in the data area 112 of the first ROM 11.

As described above, when a color encoder is provided with a frequency converter 31 for converting the frequency of a clock into a predetermined frequency, and is so configured that the clock is passed either through a frequency-converting path or through a through path in accordance with a clock-rate switching signal $K_c$, it is possible, by the use of only one data table, to cope with different clock rates and thus digital image reproduction apparatus of different reproduction systems.

Of course, it is possible, also in the first embodiment, to cope with more than one clock rate. However, there, different clock rates need to be handled by the use of a plurality of data tables, or even a plurality of ROMS. By contrast, in the third embodiment, the same object can be achieved with only one data table because of the provision of a frequency converter 31. The frequency converter 31 is composed of frequency dividers and other components, and can be realized in far smaller size than a ROM. Accordingly, the color encoder of the third embodiment can be made more compact than that of the first embodiment.

The clock-rate switching signal $K_c$ is generated, for example, at the same time as the user selects a specific digital image reproduction apparatus from available choices.

In the third embodiment described above, the frequency converter 31 is provided with two paths, one that divides a frequency by two and the other that does not affect it. However, in actual implementation, any number of paths can be provided for frequency division or multiplication of different factors. In this way, it is possible to cope with more than two clock rates.

Figure 7:
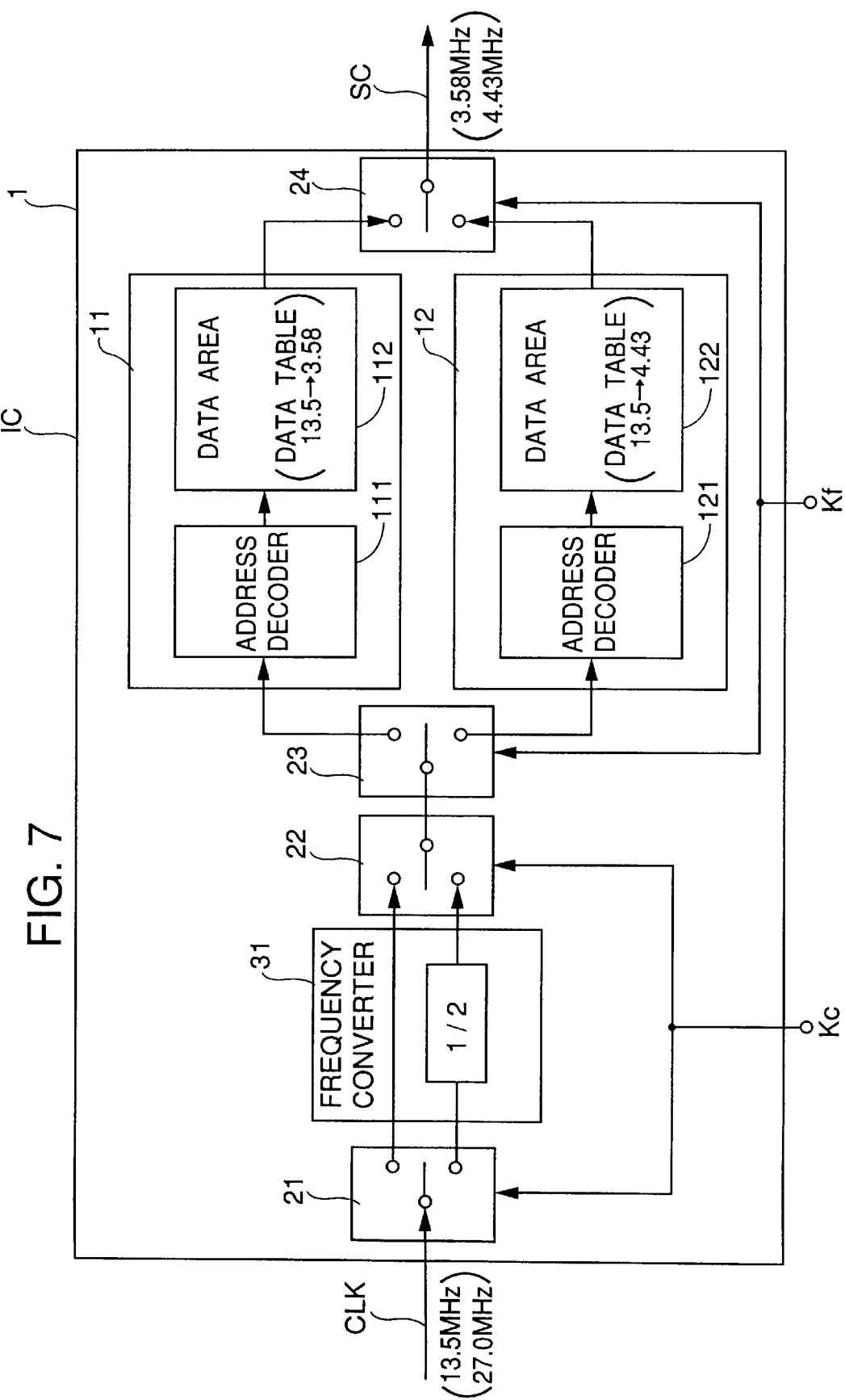
FIG. 7 is a diagram showing the construction of the chrominance subcarrier generator in the color encoder of a fourth embodiment of the present invention.

In the color encoder of a fourth embodiment, the chrominance subcarrier generator 1 is, as shown in FIG. 7, provided with a first ROM 11, a second ROM 12, switches 21, 22, 23, and 24, and a frequency converter 31. The first and second ROMs 11 and 12 respectively have address decoders 111 and 121, and data areas 112 and 122. Here, the chrominance subcarrier SC is generated from a clock CLK supplied from the outside, by the use of a data table selected by the switches 21, 22, 23, and 24 from the data tables stored in the data areas 112 and 122 of the first and second ROMs 11 and 12.

In the fourth embodiment, in the data area 112 of the first ROM 11 is stored a data table used to obtain a 3.58 MHz $f_{sc}$ frequency for the NTSC system from a clock having a clock rate of 13.5 MHz, which is one of the two clock rates used in the video-CD system, and in the data area 122 of the second ROM 12 is stored a data table used to obtain a 4.43 MHz $f_{sc}$ frequency for the PAL system from a clock having the same frequency of 13.5 MHz. Moreover, the frequency converter 31 has a frequency-dividing path through which a frequency is divided by two, and a through path through which a frequency is passed unprocessed.

The fourth embodiment is used, for example, to cope with the two clock rates, i.e. 13.5 MHz and 27.0 MHz used in the video-CD system. In this case, by setting, in accordance with a clock-rate switching signal $K_c$, the switches 21 and 22 to the through-path positions when the clock rate is 13.5 MHz and to the frequency-dividing positions when the clock rate is 27.0 MHz, and in addition by setting the switches 23 and 24 in accordance with an $f_{sc}$ switching signal $K_f$, it is possible to cope with both of the clock rates, i.e. 13.5 MHz and 27.0 MHz, used in the video-CD system as well as both of the $f_{sc}$ frequencies, 3.58 MHz and 4.43 MHz, used in the NTSC and PAL systems, respectively.

As described above, when a color encoder is provided with a frequency converter 31 for converting the frequency of a clock into a predetermined frequency and with a plurality of data tables, and is so configured that the clock is passed either through a frequency-converting path or through a through path in accordance with a clock-rate switching signal $K_c$ and that a data table to be used for conversion is selected from among a plurality of data tables in accordance with an $f_{sc}$ switching signal $K_f$, it is possible to cope with different clock rates as well as different $f_{sc}$ frequencies, that is, to cope with digital image reproduction apparatus of different reproduction systems as well as different television systems.

Of course, it is possible, also in the second embodiment, to cope with digital image reproduction apparatus of more than one reproduction system as well as more than one television system. However, in the fourth embodiment, the same object can be achieved with fewer data tables and thus with fewer ROMs than in the second embodiment, because of the provision of a frequency converter 31 in the former.

The frequency converter 31 is composed of frequency dividers and other components, and can be realized in far smaller size than a ROM. Accordingly, the color encoder of the fourth embodiment can be made more compact than that of the second embodiment.

The clock-rate switching signal $K_c$ and the $f_{sc}$ switching signal $K_f$ are generated, for example, at the same time as the user selects a specific combination of a digital image reproduction apparatus and a television system from available choices.

In the fourth embodiment described above, the frequency converter 31 is provided with two paths, one that divides a frequency by two and the other that does not affect it. However, in actual implementation, any number of paths can be provided for frequency division or multiplication of different factors. In this way, it is possible to cope with more than two clock rates.

Figure 8:
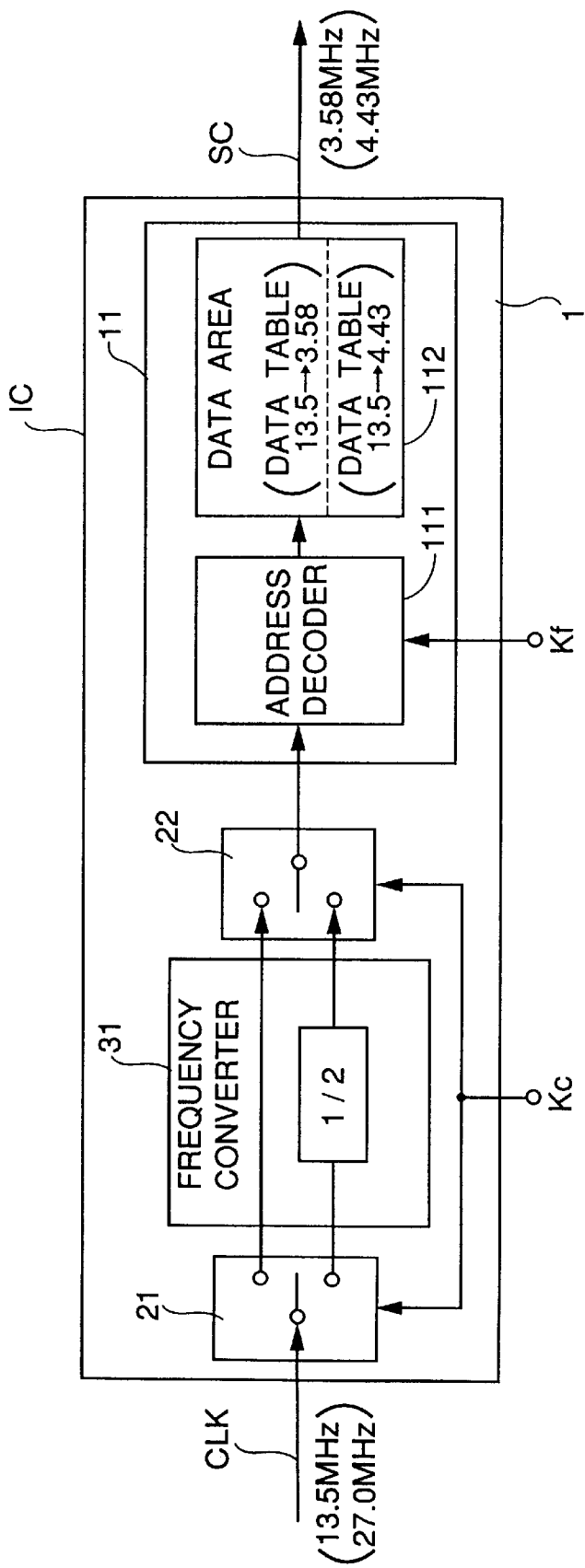
FIG. 8 is a diagram showing a modified construction of the chrominance subcarrier generator in the fourth embodiment.

In cases where the ROM has a data area having an ample data storage capacity, it is also possible, instead of storing only one data table in each ROM as in the fourth embodiment described above, to divide the data area of a ROM into two or more subareas so that a data table is stored in each of those subareas, as shown in FIG. 8. In short, a ROM may contain more than one data table. This makes efficient use of the data area of a ROM possible, and thus helps reduce the number of ROMs required. In this case, the $f_{sc}$ switching signal $K_f$ needs to be so generated as to switch address groups properly so that the address decoder is provided with appropriate addresses.

Figure 12:
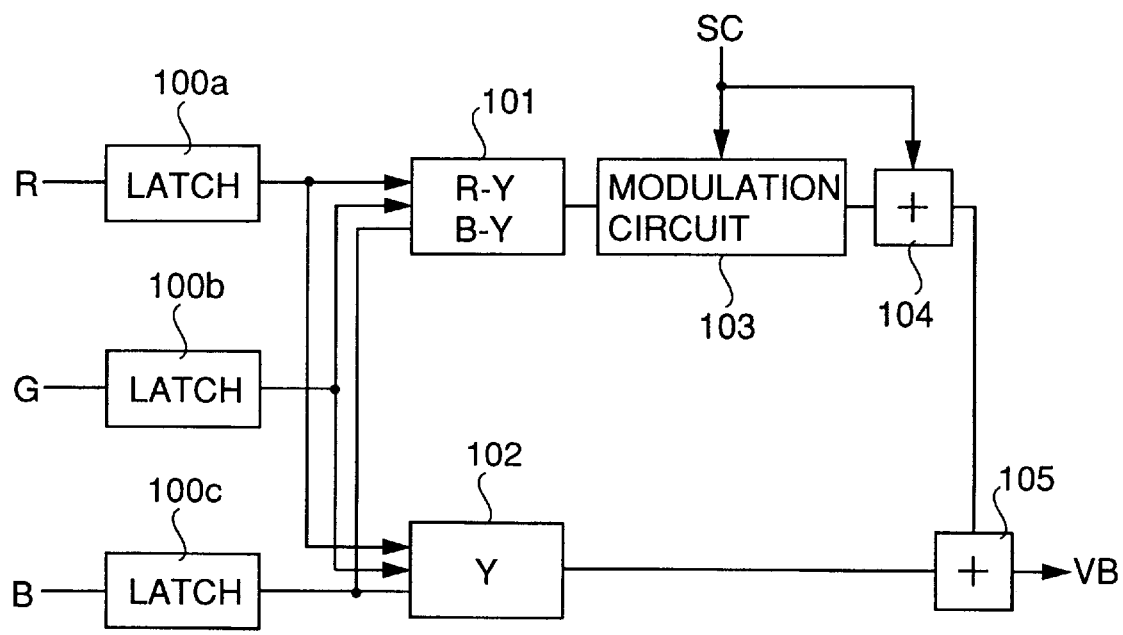
FIG. 12 is a block diagram showing the details of the encoder in FIG. 1.

FIG. 12 is a block diagram showing the details of the encoder 2 (in FIG. 1) that uses the chrominance subcarrier generated as described heretofore. In FIG. 12, numerals 100a, 100b, and 100c represent latch circuits that latch digital RGB signals supplied from the outside; numeral 101 represents a color-difference signal generating circuit that produces R-Y and B-Y signals from the RGB signals; numeral 102 represents a luminance signal generating circuit that produces a luminance signal Y from the RGB signals; numeral 103 represents a modulation circuit that modulates the chrominance subcarrier SC with the R-Y and B-Y signals; numeral 104 represents an adder circuit that inserts the chrominance subcarrier SC into the modulated signal at its color burst positions; numeral 105 represents an adder circuit that adds together the chrominance signal outputted from the adder circuit 104 and the luminance signal Y outputted from the luminance signal generating circuit 102.

As described above, according to the present invention, it is possible to make a color encoder capable of coping with a plurality of clock rates or a plurality of $f_{sc}$ frequencies, or alternatively, to make it capable of coping with both a plurality of clock rates and a plurality of $f_{sc}$ frequencies. As a result, according to the present invention, it is possible, with one color encoder, to cope with digital image reproduction apparatus of different reproduction systems as well as different television systems.

What is claimed is:

1. A color encoder for producing a color video signal from a three-primary-color signal and a clock supplied from outside by first generating a chrominance subcarrier from the clock by use of chrominance subcarrier generating means and then combining the three-primary-color signal with the chrominance subcarrier to produce the color video signal, wherein said chrominance subcarrier generating means includes means for generating a chrominance subcarrier having a same frequency in response to any of a plurality of clocks having different predetermined frequencies, wherein said plurality of clocks are from one of a) more than one reproductive system and b) more than one television system.

2. A color encoder as claimed in claim 1,
wherein said chrominance subcarrier generating means includes means for changing a frequency of the chrominance subcarrier in accordance with a switching signal.

3. A color encoder as claimed in claim 1,
wherein said chrominance subcarrier generating means includes a plurality of ROMs, each containing in its data area a data table corresponding to a different frequency, and includes ROM switching means for selecting a ROM to be accessed from among the plurality of ROMs in accordance with a switching signal.

4. A color encoder as claimed in claim 1,
wherein said chrominance subcarrier generating means includes a ROM whose data area is divided into a plurality of data subareas, each containing a data table corresponding to a different frequency, and includes data subarea switching means for selecting a data subarea to be accessed from among the plurality of data subareas in accordance with a switching signal.

5. A color encoder as claimed in claim 1,
wherein said chrominance subcarrier generating means includes a plurality of ROMs of which each has a data area divided into a plurality of data subareas, each containing a data table corresponding to a different frequency, and includes ROM switching means for selecting a ROM to be accessed from among the plurality of ROMs in accordance with a switching signal and data subarea switching means for selecting a data subarea to be accessed from among the plurality of data subareas in accordance with the switching signal.

6. A color encoder as claimed in claim 1,
wherein said chrominance subcarrier generating means includes a frequency converter for converting any of a plurality of clocks having different predetermined frequencies into a clock having a same frequency in accordance with a switching signal.

7. A color encoder for producing a color video signal from a three-primary-color signal and a clock supplied from outside by first generating a chrominance subcarrier from the clock by use of chrominance subcarrier generating means and then combining the three-primary-color signal with the chrominance subcarrier to produce the color video signal,
wherein said chrominance subcarrier generating means includes means that generates one of a plurality of chrominance subcarriers having different predetermined frequencies from a clock having a same frequency in accordance with a switching signal, wherein said switching signal indicating one of a) more than one reproductive system and b) more than one television system.

8. A color encoder as claimed in claim 7,
wherein said chrominance subcarrier generating means includes a plurality of ROMs, each containing in its data area a data table corresponding to a different frequency, and includes ROM switching means for selecting a ROM to be accessed from among the plurality of ROMs in accordance with a switching signal.

9. A color encoder as claimed in claim 7,
wherein said chrominance subcarrier generating means includes a ROM whose data area is divided into a plurality of data subareas, each containing a data table corresponding to a different frequency, and includes data subarea switching means for selecting a data subarea to be accessed from among the plurality of data subareas in accordance with a switching signal.

10. A color encoder as claimed in claim 7,
wherein said chrominance subcarrier generating means includes a plurality of ROMs of which each has a data area divided into a plurality of data subareas, each containing a data table corresponding to a different frequency, and includes ROM switching means for selecting a ROM to be accessed from among the plurality of ROMs in accordance with a switching signal and data subarea switching means for selecting a data subarea to be accessed from among the plurality of data subareas in accordance with the switching signal.

11. A color encoder as claimed in claim 7,
wherein said chrominance subcarrier generating means includes a frequency converter for converting any of a plurality of clocks having different predetermined frequencies into a clock having a same frequency in accordance with a switching signal.

12. A color encoder comprising:
RGB input terminals for receiving R, G, and B signals reproduced from a recording medium;
a latch circuit for latching the R, G, and B signals;
a color-difference signal forming circuit for forming a color-difference signal from the R, G, and B signals latched by the latch circuit;
a modulation circuit for modulating a chrominance subcarrier with the color-difference signal output from the color-difference signal forming circuit; and
chrominance subcarrier generating means for generating the chrominance subcarrier from a clock signal supplied from outside;
wherein said chrominance subcarrier generating means includes means for generating a chrominance subcarrier having a same frequency in response to any of a plurality of clocks having different predetermined frequencies, wherein said plurality of clocks are from one of a) more than one reproductive system and b) more than one television system.

13. A color encoder as claimed in claim 12,
wherein said chrominance subcarrier generating means includes a plurality of ROMs, each containing in its data area a data table corresponding to a different frequency, and includes ROM switching means for selecting a ROM to be accessed from among the plurality of ROMs in accordance with a switching signal.

14. A color encoder as claimed in claim 12,
wherein said color encoder is incorporated in an apparatus for reproducing a signal recorded on a disk for a video-CD, CD-G, or similar system so as to serve as an interface between the apparatus and a television receiver.

15. A color encoder comprising:
RGB input terminals for receiving R, G, and B signals reproduced from a recording medium;
a latch circuit for latching the R, G, and B signals;
a color-difference signal forming circuit for forming a color-difference signal from the R, G, and B signals latched by the latch circuit;

a modulation circuit for modulating a chrominance subcarrier with the color-difference signal output from the color-difference signal forming circuit; and chrominance subcarrier generating means for generating the chrominance subcarrier from a clock signal supplied from outside;

wherein said chrominance subcarrier generating means includes means for generating one of a plurality of chrominance subcarriers having different predetermined frequencies from a clock having a same frequency, in accordance with a switching signal, wherein said switching signal indicating one of a) more than one reproductive system and b) more than one television.

\* \* \* \* \*